(12) United States Patent
Matkovic et al.

(10) Patent No.: US 12,450,028 B1
(45) Date of Patent: Oct. 21, 2025

(54) FILE EXISTENCE CHECKS USING LIST API

(71) Applicant: Snowflake Inc., Bozeman, MT (US)

(72) Inventors: Nemanja Matkovic, Seattle, WA (US); Polita Paulus, Kirkland, WA (US); Gaurav Saxena, Bellevue, WA (US); Kedar Nitin Shah, Sammamish, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/806,187

(22) Filed: Aug. 15, 2024

(51) Int. Cl.
    *G06F 7/08*     (2006.01)
    *G06F 16/174*     (2019.01)

(52) U.S. Cl.
    CPC ............ *G06F 7/08* (2013.01); *G06F 16/1748* (2019.01)

(58) Field of Classification Search
    CPC ............................... G06F 7/08; G06F 16/1748
    See application file for complete search history.

(56) References Cited

U.S. PATENT DOCUMENTS

| | | | | |
|---|---|---|---|---|
| 7,401,097 B1* | 7/2008 | Baer | ..................... | G06F 40/143 |
| 11,716,312 B1* | 8/2023 | McNamara, Jr. | ....... | G06F 21/46 726/6 |
| 2016/0224548 A1* | 8/2016 | Massand | ................. | G06F 16/93 |
| 2018/0075058 A1* | 3/2018 | Boutnaru | ................ | H04L 63/04 |
| 2019/0243702 A1* | 8/2019 | Shilane | ............... | G06F 11/0709 |
| 2023/0315321 A1* | 10/2023 | Karlberg | ............. | G06F 16/2272 707/791 |

* cited by examiner

*Primary Examiner* — Tyler J Torgrimson
(74) *Attorney, Agent, or Firm* — Schwegman Lundberg & Woessner, P.A.

(57) ABSTRACT

A data platform that performs a file existence check is provided. The data platform creates a bounded page and selects a set of selected metadata files from a set of metadata files, where each selected metadata file includes a set of data file metadata files. Each member of the set of data file metadata files includes a file name of a respective data file. The data platform stores the set of data file metadata files of each selected metadata file in a first sorted list in the bounded page. The data platform retrieves a second sorted list of file names of a set of data files stored on a data storage system. The data platform determines the existence of each respective data file of each member of the set of data file metadata files on the data storage system by comparing the first sorted list to the second sorted list.

27 Claims, 7 Drawing Sheets

FILE EXISTENCE CHECKS USING LIST API

TECHNICAL FIELD

Examples of the disclosure relate generally to data platforms and, more specifically, to determining file consistency of database objects.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems. Cloud-based data platforms may communicate data between databases.

BRIEF DESCRIPTION OF THE DRAWINGS

The present disclosure will be understood more fully from the detailed description given below and from the accompanying drawings of various examples of the disclosure.

DETAILED DESCRIPTION

Figure 1:
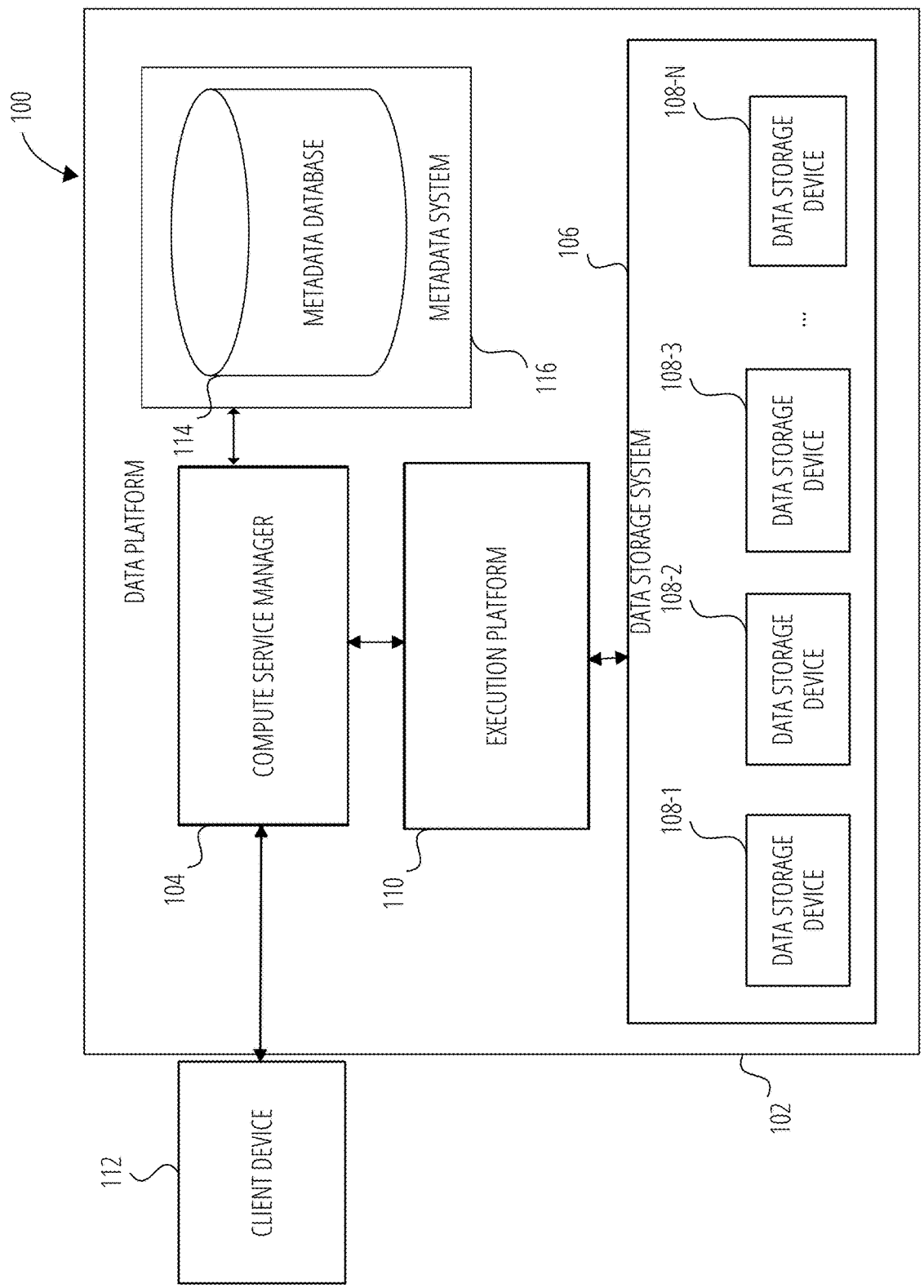
FIG. 1 illustrates an example computing environment that includes a network-based data platform in communication with a cloud storage provider user system, according to some examples.

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems. Cloud-based data platforms may communicate data between databases.

File integrity checking is an aspect of maintaining data consistency and reliability in these data platforms. One of the key challenges in this area is efficiently verifying the existence and integrity of billions of files stored on data storage system and managed by the data platform using metadata. Traditional methods of file existence checking, such as using individual calls to retrieve metadata from the data storage system for comparison with the metadata of the data platform, have proven to be expensive and time-consuming due to the significant network and connection overhead involved in making numerous calls. For instance, in deployments with approximately 16 billion files, the individual call strategy requires checking all these files every three days, resulting in substantial costs.

The methodologies described in this disclosure address the challenges of file existence checking in large-scale data platforms by introducing an efficient approach to verify the existence and integrity of billions of files. This approach utilizes list-based file existence checking that reduces the number of Application Programming Interface (API) calls required and improves overall execution time.

In some examples, the methodologies provide for a bounded page in a working memory of the data platform, which serves as a defined memory space for storing and processing data. This bounded page is used to store a sorted list of metadata files, allowing for efficient searching and comparison operations. A compute service manager of the data platform selects a subset of metadata files for the bounded page using a knapsack fitting algorithm, optimizing the use of available memory while maximizing the number of files that can be checked in each iteration.

By retrieving a second sorted list of file names from the data storage system using a LIST API call, the compute service manager can efficiently compare the metadata with the actual files stored in the system. This approach is more scalable than using individual HEAD calls, especially when dealing with billions of files. The comparison process is further optimized by using lexical ordering of file names and implementing parallel processing when multiple bounded pages are created.

In some examples, the compute service manager also incorporates a consistency check using attribute data associated with each file, enhancing the integrity verification process. For files not found in the initial comparison, the system employs a fallback mechanism using individual calls for metadata stored on the data storage system for further verification, ensuring comprehensive coverage while maintaining efficiency.

These methodologies result in reduced resource requirements, improved execution time, and lower operational costs compared to traditional file existence checking methods. By addressing the scalability and efficiency challenges of file integrity checking in large-scale data platforms, the described methodologies provide a robust and cost-effective approach to maintaining data consistency and reliability.

In some examples, the compute service manager creates a bounded page in a memory of a machine and performs several operations. The compute service manager selects a set of selected metadata files from a set of metadata files, where each selected metadata file includes a set of data file metadata files. Each member of the set of data file metadata files includes a file name of a respective data file. The compute service manager then stores the set of data file metadata files of each selected metadata file in a first sorted list in the bounded page. The compute service manager retrieves a second sorted list of file names of a set of data files stored on a data storage system. The compute service manager determines the existence of each respective data file of each member of the set of data file metadata files on the data storage system by comparing the first sorted list to the second sorted list.

In some examples, the metadata file selecting operation is performed as a selection without replacement, and the operations are repeated until all members of the set of metadata files are selected.

In some examples, the set of selected metadata files are selected using a knapsack fitting algorithm using a size of each member of the set of metadata files and a size of the bounded page.

In some examples, the machine-implemented method includes filtering duplicate file names from the first sorted list.

In some examples, the compute service manager sorts both the first and second lists based on a lexical order of the file names. Specifically, the first sorted list is sorted based on a lexical order of the file name for the respective data file of each member of the set of data file metadata files. Similarly, the second sorted list is sorted based on a lexical order of the file names of the set of data files stored on the data storage system.

In some examples, the compute service manager compares the first sorted list to the second sorted list by performing a set of initial operations and one or more subsequent operations. For the initial operations, the compute service manager selects an initial data file metadata file from the first sorted list, searches from the beginning of the second sorted list for a file name included in the initial data file metadata file, and in response to finding the file name, sets a pointer at the location in the second sorted list where the file name was found. For the subsequent operations, the compute service manager selects a subsequent data file metadata file from the first sorted list, searches from the location of the pointer for a file name included in the subsequent data file metadata file, and in response to finding the file name, sets the pointer in the second sorted list at the location where the file name was found.

In some examples, the compute service manager creates a plurality of bounded pages and creates a plurality of first sorted lists, with each first sorted list stored in a respective bounded page of the plurality of bounded pages. When determining the existence of each respective data file of each member of the set of data file metadata files on the data storage system, the compute service manager compares the plurality of first sorted lists to the second sorted list in parallel processes.

In some examples, in response to determining a size of a metadata file meets or falls below a threshold size, the compute service manager determines the existence of each respective data file of each data file metadata file on the data storage system based on a metadata request for the respective data file to the data storage system.

In some examples, the second sorted list includes attribute data associated with each file name of the second sorted list. The compute service manager performs additional operations that include conducting a consistency check for each data file using the attribute data from the second sorted list and the respective data file metadata file.

Reference will now be made in detail to specific examples for carrying out the inventive subject matter. Examples of these specific examples are illustrated in the accompanying drawings, and specific details are set forth in the following description in order to provide a thorough understanding of the subject matter. It will be understood that these examples are not intended to limit the scope of the claims to the illustrated examples. On the contrary, they are intended to cover such alternatives, modifications, and equivalents as may be included within the scope of the disclosure.

FIG. 1 illustrates an example computing environment 100 that includes a data platform 102 in communication with a client device 112, according to some examples. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the data platform 102 comprises a data storage system 106, a compute service manager 104, an execution platform 110, and a metadata system 116. The data storage system 106 comprises a plurality of computing machines and provides on-demand computer system resources such as data storage and computing power to the data platform 102. As shown, the data storage system 106 comprises multiple data storage devices, such as data storage device 108-1, data storage device 108-2, data storage device 108-3, and data storage device 108-N. In some examples, the data storage devices 1 to N are cloud-based storage devices located in one or more geographic locations. For example, the data storage devices 1 to N may be part of a public cloud infrastructure or a private cloud infrastructure. The data storage devices 1 to N may be hard disk drives (HDDs), solid state drives (SSDs), storage clusters, Amazon S3™ storage systems or any other data storage technology. Additionally, the data storage system 106 may include distributed file systems (e.g., Hadoop Distributed File Systems (HDFS)), object storage systems, and the like.

In some examples, one or more of the data storage devices 108-1 to 108-N are cloud-based datastores configured as Virtual Private Clouds (VPCs). In some examples, A VPC is a secure, isolated virtual network within a public cloud environment that allows organizations to run and manage their cloud resources with enhanced control and privacy. A VPC can provide the functionality of a traditional data center without the physical management and maintenance overhead, enabling users to define their own network space. This includes selecting IP address ranges, creating subnets, configuring route tables, and setting up network gateways. VPCs are beneficial for entities that desire a partitioned section of the cloud to ensure that their applications and data are isolated from other users on the same public cloud platform. This isolation helps in maintaining security and compliance with regulatory requirements, while also allowing for scalable and flexible resource management.

In some examples, data objects are stored in structured data files. The structured data files can be in various structured file formats such as, but not limited to, Comma-Separated Values (CSV) JavaScript Object Notation (JSON), Apache Avro (Avro), Apache Parquet (Parquet) Optimized Row Columnar (ORC), Extensible Markup Language (XML), and the like.

In some examples, the data platform 102 organizes data storage using micro-partitions of a database table using a suitable structured data file format specifically designed for optimal performance and security within the computing environment 100 such as, but not limited to, Flocon De Neige (FDN) and the like. Whenever new data is added to a table, new micro-partition files are created. This approach ensures that data is stored in an immutable format where the addition of a new record results in the generation of a new micro-partition file.

The data platform 102 is used for reporting and analysis of integrated data from one or more disparate sources including the storage devices 1 to N within the data storage system 106. The data platform 102 hosts and provides data reporting and analysis services to multiple consumer accounts. Administrative users can create and manage identities (e.g., users, roles, and groups) and use privileges to allow or deny access to identities to resources and services. Generally, the data platform 102 maintains numerous consumer accounts for numerous respective consumers. The data platform 102 maintains each consumer account in one or more storage devices of the data storage system 106. Moreover, the data platform 102 may maintain metadata associated with the consumer accounts in the metadata database 114 of the metadata system 116. Each consumer account includes multiple objects with examples including users, roles, privileges, a datastores or other data locations.

The compute service manager 104 coordinates and manages operations of the data platform 102. The compute service manager 104 also performs query optimization and compilation as well as managing clusters of compute services that provide compute resources (also referred to as "virtual warehouses"). The compute service manager 104 can support any number and type of clients such as end users providing data storage and retrieval requests, system administrators managing the systems and methods described herein, and other components/devices that interact with compute service manager 104. As an example, the compute service manager 104 is in communication with the client device 112. The client device 112 can be used by a user of one of the multiple consumer accounts supported by the data platform 102 to interact with and utilize the functionality of the data platform 102. In some examples, the compute service manager 104 does not receive any direct communications from the client device 112 and only receives communications concerning jobs from a queue within the data platform 102.

The compute service manager 104 is also coupled to metadata database metadata system 116. The metadata system 116 includes a metadata database 114 that stores metadata pertaining to various functions and examples associated with the data platform 102 and its users. In some examples, the metadata database 114 includes a summary of data stored in remote data storage systems as well as data available from a local cache. In some examples, the metadata database 114 may include information regarding how data is organized in remote data storage systems (e.g., the data storage system 106) and the local caches. In some examples, the metadata database 114 include data of metrics describing usage and access by provider users and consumers of the data stored on the data platform 102. In some examples, the metadata database 114 allows systems and services to determine whether a piece of data needs to be accessed without loading or accessing the actual data from a storage device.

The compute service manager 104 is further coupled to the execution platform 110, which provides multiple computing resources that execute various data storage and data retrieval tasks. The execution platform 110 is coupled to the data storage system 106. The execution platform 110 comprises a plurality of compute nodes. A set of processes on a compute node executes a query plan compiled by the compute service manager 104. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 104; a fourth process to establish communication with the compute service manager 104 after a system boot; and a fifth process to handle communication with a compute cluster for a given job provided by the compute service manager 104 and to communicate information back to the compute service manager 104 and other compute nodes of the execution platform 110.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another. In alternate examples, these communication links are implemented using any type of communication medium and any communication protocol.

As shown in FIG. 1, the data storage devices data storage device 108-1 to data storage device 108-N are decoupled from the computing resources associated with the execution platform 110. This architecture supports dynamic changes to the data platform 102 based on the changing data storage/retrieval needs as well as the changing needs of the users and systems. The support of dynamic changes allows the data platform 102 to scale quickly in response to changing demands on the systems and components within the data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 104, metadata system 116, execution platform 110, and data storage system 106 are shown in FIG. 1 as individual discrete components. However, each of the compute service manager 104, metadata system 116, execution platform 110, and data storage system 106 may be implemented as a distributed system (e.g., distributed across multiple systems/platforms at multiple geographic locations). Additionally, each of the compute service manager 104, metadata system 116, execution platform 110, and data storage system 106 can be scaled up or down (independently of one another) depending on changes to the requests received and the changing needs of the data platform 102. Thus, in the described examples, the data platform 102 is dynamic and supports regular changes to meet the current data processing needs.

During operation, the data platform 102 processes multiple jobs determined by the compute service manager 104. These jobs are scheduled and managed by the compute service manager 104 to determine when and how to execute the job. For example, the compute service manager 104 may divide the job into multiple discrete tasks and may determine what data is needed to execute each of the multiple discrete tasks. The compute service manager 104 may assign each of the multiple discrete tasks to one or more nodes of the execution platform 110 to process the task. The compute service manager 104 may determine what data is needed to process a task and further determine which nodes within the execution platform 110 are best suited to process the task.

Some nodes may have already cached the data needed to process the task and, therefore, be a good candidate for processing the task. Metadata stored in the metadata database 114 assists the compute service manager 104 in determining which nodes in the execution platform 110 have already cached at least a portion of the data needed to process the task. One or more nodes in the execution platform 110 process the task using data cached by the nodes and, if necessary, data retrieved from the data storage system 106. It is desirable to retrieve as much data as possible from caches within the execution platform 110 because the retrieval speed is typically faster than retrieving data from the data storage system 106.

As shown in FIG. 1, the computing environment 100 separates the execution platform 110 from the data storage system 106. In this arrangement, the processing resources and cache resources in the execution platform 110 operate independently of the database storage devices data storage device 108-1 to data storage device 108-N in the data storage system 106. Thus, the computing resources and cache resources are not restricted to a specific one of the data storage device 108-1 to data storage device 108-N. Instead, computing resources and cache resources may retrieve data from, and store data to, any of the data storage resources in the data storage system 106.

Figure 2:
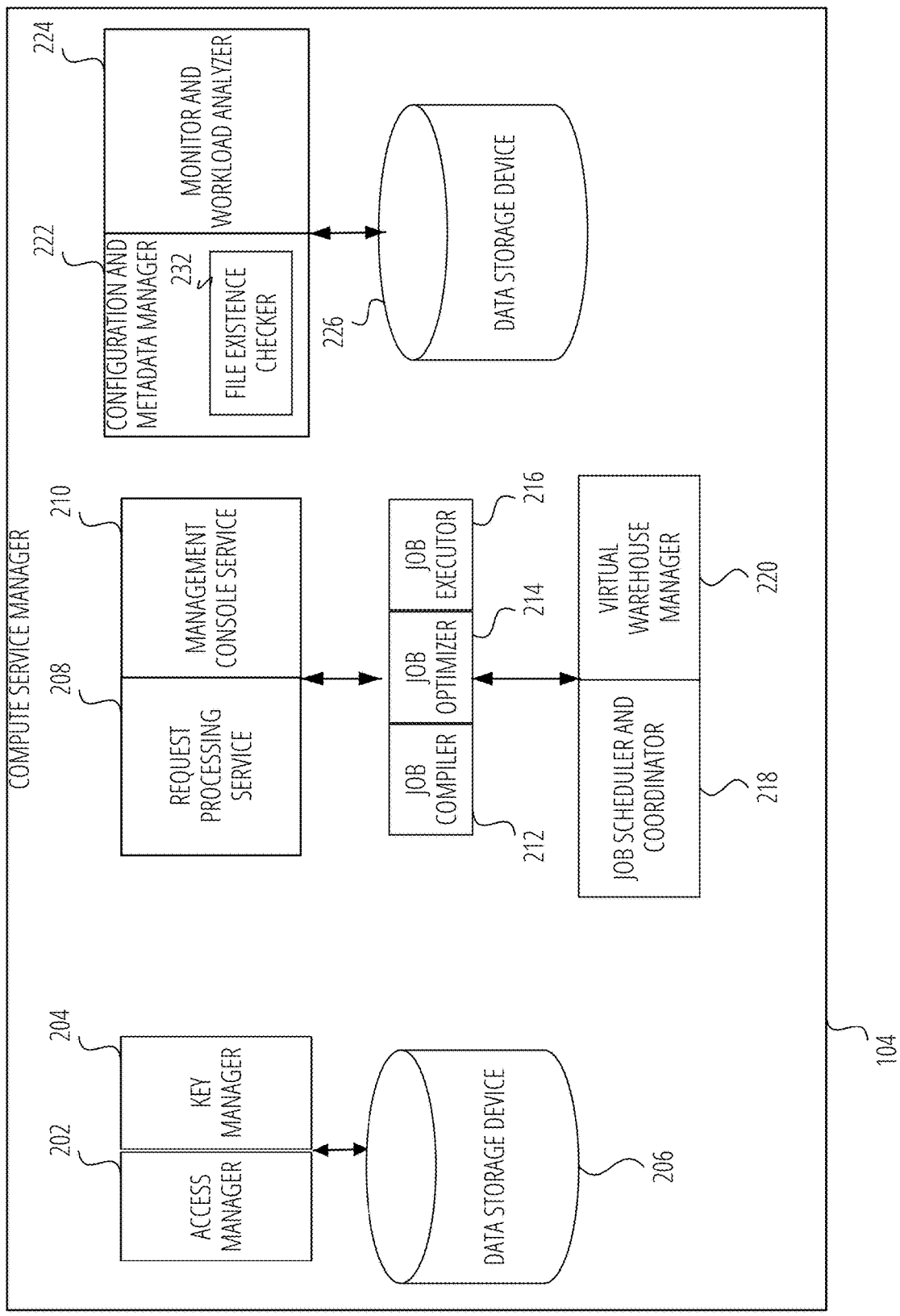
FIG. 2 is a block diagram illustrating components of a compute service manager, according to some examples.

FIG. 2 is a block diagram illustrating components of the compute service manager 104, according to some examples. As shown in FIG. 2, the compute service manager 104 includes an access manager 202, and a key manager 204. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in data storage data storage device 206). As used herein, the remote storage devices may also be referred to as "persistent storage devices" or "shared storage devices."

In some examples, the access manager 202 operates within a data platform to control access to various objects of the data platform using Role-Based Access Control (RBAC). The access manager 202 is a component that manages authentication and authorization tasks, providing for authorized entities to access specific resources within the data platform. This component plays a role in maintaining the security and integrity of the data platform by enforcing access policies defined through RBAC.

In some examples, RBAC is implemented by defining roles within the data platform, where each role is associated with a specific set of permissions. These permissions determine the actions that entities assigned to the role can perform on various objects within the data platform. The access manager 202 utilizes these roles to make access control decisions, allowing or denying requests based on the roles assigned to the requesting entity and the permissions associated with those roles.

In some examples, the data platform creates specific access roles based on a manifest of an application received from an application package. These access roles are activated by the access manager 202 and are used to govern access to objects used by the application during operation. For example, an access role may grant the application the ability to create a compute pool and execute a service within that compute pool. The access manager 202 provides that an application, or entities authorized by the application, can perform actions permitted by the access role.

In some examples, the access manager 202 also controls access to objects of the data platform using the access roles during the execution of the service within the compute pool. The service accesses objects of the application package and of the data platform under the governance of the activated access roles. The access manager 202 checks the permissions associated with the access roles against the access requests made by the service, granting or denying these requests based on the defined RBAC policies.

In some examples, the role of the access manager 202 extends to managing access to hidden repositories within a provider account, where the application package is stored. The access manager 202 uses RBAC to restrict access to a hidden repository, providing for the application package to be accessible to entities with the appropriate access role. This mechanism protects the application package from unauthorized access, preserving the integrity of the provider's intellectual property.

In some examples, the access manager 202 implements RBAC to isolate the compute pool, preventing the service from accessing other services or resources not specified in the application package. This isolation is achieved by defining access roles that explicitly limit the service's permissions to the resources provided for the operation of the service, thereby enhancing the security of the service execution environment.

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage system 106.

A management console service 210 supports access to various systems and processes by administrators and other system managers. Additionally, the management console service 210 may receive a request to execute a job and monitor the workload on the system.

The compute service manager 104 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 104.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 determines a priority for internal jobs that are scheduled by the compute service manager 104 with other "outside" jobs such as user queries that may be scheduled by other systems in the database but may utilize the same processing resources in the execution platform 110. In some examples, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 104 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversees processes performed by the compute service manager 104 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the data platform 102. For example, data storage device 226 may represent caches in execution platform 110, storage devices in data storage system 106, or any other storage device.

The configuration and metadata manager 222 includes a file existence checker 232. The file existence checker 232 accesses data file metadata stored by the metadata system 116 (of FIG. 1) to check for the existence of data files stored by the data storage system 106 (of FIG. 1). In some examples, the compute service manager 104 uses the file existence checker 232 to check for the existence of the data files by comparing the data file metadata to listings and metadata received from the data storage system 106 as more fully described in reference to FIG. 4, FIG. 5, and FIG. 6.

The compute service manager 104 validates communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 304*a*) may need to communicate with another execution node (e.g., execution node 304*b*), and should be disallowed from communicating with a third execution node (e.g., execution node 316*a*) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
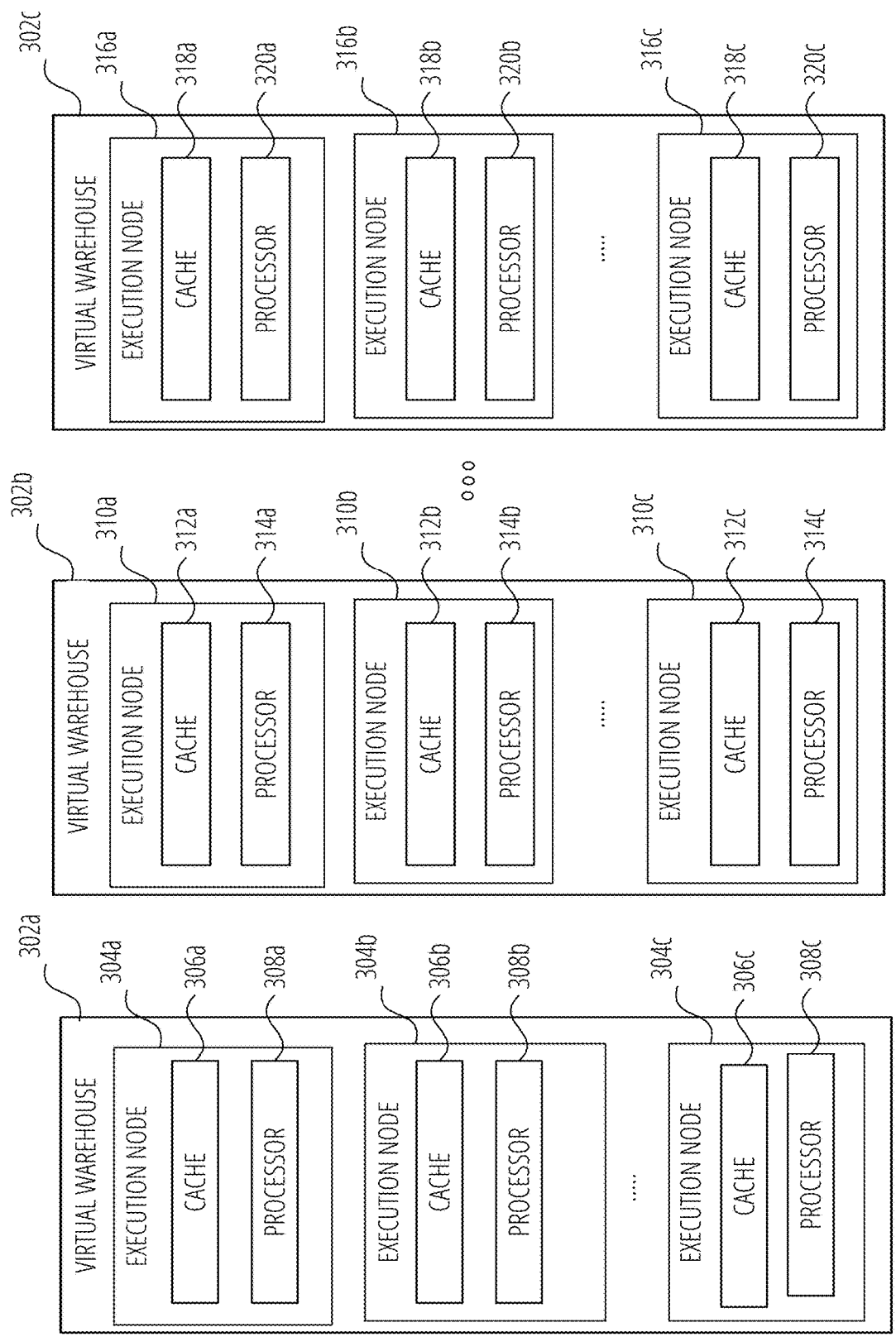
FIG. 3 is a block diagram illustrating components of an execution platform, according to some examples.

FIG. 3 is a block diagram illustrating components of the execution platform 110, according to some examples. As shown in FIG. 3, the execution platform 110 includes multiple virtual warehouses, including virtual warehouse 302*a*, and virtual warehouse 302*b* to virtual warehouse 302*c*. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. Virtual warehouses can access data from any data storage device (e.g., any storage device in data storage system 106).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 1 to N shown in FIG. 1. Thus, the virtual warehouses are not necessarily assigned to a specific data storage device to N and, instead, can access data from any of the data storage devices 1 to N within the data storage system 106. Similarly, each of the execution nodes shown in FIG. 3 can access data from any of the data storage devices 1 to N. In some examples, a particular virtual warehouse or a particular execution node may be temporarily assigned to a specific data storage device, but the virtual warehouse or execution node may later access data from any other data storage device.

In the example of FIG. 3, virtual warehouse 302*a* includes a plurality of execution nodes as exemplified by execution node 304*a*, execution node 304*b*, and execution node 304*c*. Execution node 304*a* includes cache 306*a* and a processor 308*a*. Execution node 304*b* includes cache 306*b* and processor 308*b*. Execution node 304*c* includes cache 306*c* and processor 308*c*. Each execution node 1 to N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 302*a* discussed above, virtual warehouse 302*b* includes a plurality of execution nodes as exemplified by execution node 310*a*, execution node 310*b*, and execution node 310*c*. Execution node 304*a* includes cache 312*a* and processor 314*a*. Execution node 310*b* includes cache 312*b* and processor 314*b*. Execution node 310*c* includes cache 312*c* and processor 314*c*. Additionally, virtual warehouse 302*c* includes a plurality of execution nodes as exemplified by execution node 316*a*, execution node 316*b*, and execution node 316*c*. Execution node 316*a* includes cache 318*a* and processor 320*a*. Execution node 316*b* includes cache 318*b* and processor 320*b*. Execution node 316*c* includes cache 318*c* and processor 320*c*.

In some examples, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate examples may include execution nodes containing any number of processors and any number of caches. Additionally, the caches may vary in size among the different execution nodes. The caches shown in FIG. 3 store, in the local execution node, data that was retrieved from one or more data storage devices in data storage system 106. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some examples, the caches are implemented using high-speed memory devices that provide fast access to the cached data. Each cache can store data from any of the storage devices in the data storage system 106.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some examples, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some examples, these different computing systems are cloud-based computing systems maintained by one or more different entities.

Additionally, each virtual warehouse as shown in FIG. 3 has multiple execution nodes. The multiple execution nodes associated with each virtual warehouse may be implemented using multiple computing systems at multiple geographic locations. For example, an instance of virtual warehouse 302a implements execution node 304a and execution node 304b on one computing platform at a geographic location and implements execution node 304c at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some examples, the virtual warehouses may operate on the same data in data storage system 106, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
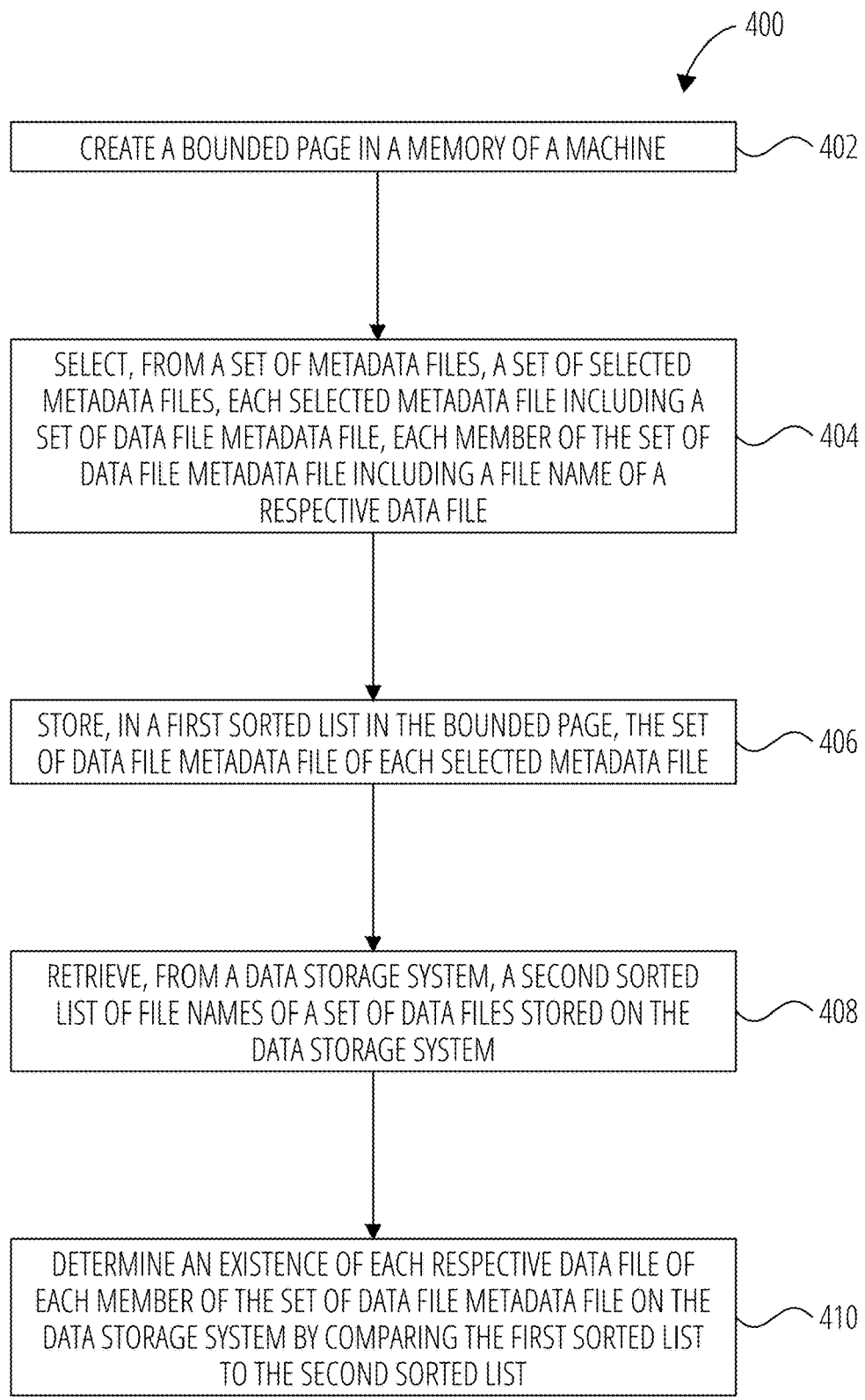
FIG. 4 illustrates a file existence checking method, according to some examples.

FIG. 4 illustrates an example file existence checking method 400, according to some examples. A compute service manager, such as compute service manager 104 of FIG. 1, uses the file existence checking method 400 to confirm the existence of a set of files on a data storage system using metadata. Although the example file existence checking method 400 depicts a particular sequence of operations, the sequence may be altered without departing from the scope of the present disclosure. For example, some of the operations depicted may be performed in parallel or in a different sequence that does not materially affect the function of the file existence checking method 400. In other examples, different components of an example device or system that implements the file existence checking method 400 may perform functions at substantially the same time or in a specific sequence.

In operation 402, the compute service manager creates a bounded page in a working memory of a data platform, such as data platform 102 of FIG. 1. For example, the bounded page serves as a defined memory space for storing and processing data. In some examples, the bounded page is created within the working memory can be part of the main memory 732 of the machine 700 illustrated in FIG. 7. In some examples, the memory can be a heap memory that is dynamically allocated. In some examples, the bounded page has a specific size that is determined based on the requirements of the file existence checking process. The size of the bounded page can be optimized to balance memory usage and performance, allowing for efficient storage and retrieval of metadata during the file existence checking operations.

In operation 404, the compute service manager selects, from a set of metadata files, a set of selected metadata files, each selected metadata file including a set of data file metadata files where each member of the set of data file metadata files includes a file name of a respective data file. For example, in reference to FIG. 5, a data platform stores a set of metadata files, such as metadata file 502, metadata file 512, and metadata file 532. Each metadata file includes a set of data file metadata files for respective sets of files that are stored on a data storage system, such as data storage system 106 of FIG. 1, that serves the data platform. In the example, the data file metadata files include data file metadata file 536, data file metadata file 538, data file metadata file 542, data file metadata file 544, data file metadata file 546, data file metadata file 548, data file metadata file 550, data file metadata file 552, and data file metadata file 554.

Each data file metadata file includes a file name and a set of attribute metadata for a respective data file stored on the data storage system, such as file name 530 and attribute metadata 540 of data file metadata file 536.

In some examples a file name is stored in the metadata file using a shortened name or short name. For example, a first six letters of the file name is used, then a tilde as added to the short name, and then an incrementing number is added in order for the file name to be unique. In some examples, a full file name is stored in the data file metadata of a metadata file. In some examples, a data platform can reconstruct a data file path for a data file using the short name.

The compute service manager selects a subset of metadata files from the set of metadata files to store in the bounded page. For example, in reference to FIG. 5, the compute service manager selects metadata file 532 and copies data file metadata file 536, data file metadata file 538, and data file metadata file 542 of metadata file 532 into a bounded page 528. In addition, the compute service manager selects metadata file 502 and copies data file metadata file 550, data file metadata file 552, and data file metadata file 554 into the bounded page 528. Based on a knapsack algorithm, the compute service manager determines that it is more efficient to copy the contents of metadata file 502 and metadata file 532 into the bounded page 528 while leaving metadata file 512 to be selected for another round of processing.

In some examples, the selection is made based on the sizes of the data file metadata files so as to maximize a number of data file metadata files that are packed into the bounded page. This selection process allows the compute service manager to work with a manageable amount of data at a time as well as increases the throughput of the process by working on the smallest metadata files first. In some examples, the compute service manager may use a knapsack fitting algorithm to select the metadata files based on an amount or size of the metadata in the metadata file and the size of the bounded page. For example, the compute service manager sorts the set of metadata files by size. Then the compute service manager copies data file metadata files from the smallest metadata file into the bounded page working from a smallest metadata file first to larger metadata files in order until the bounded page is full.

Figure 5:
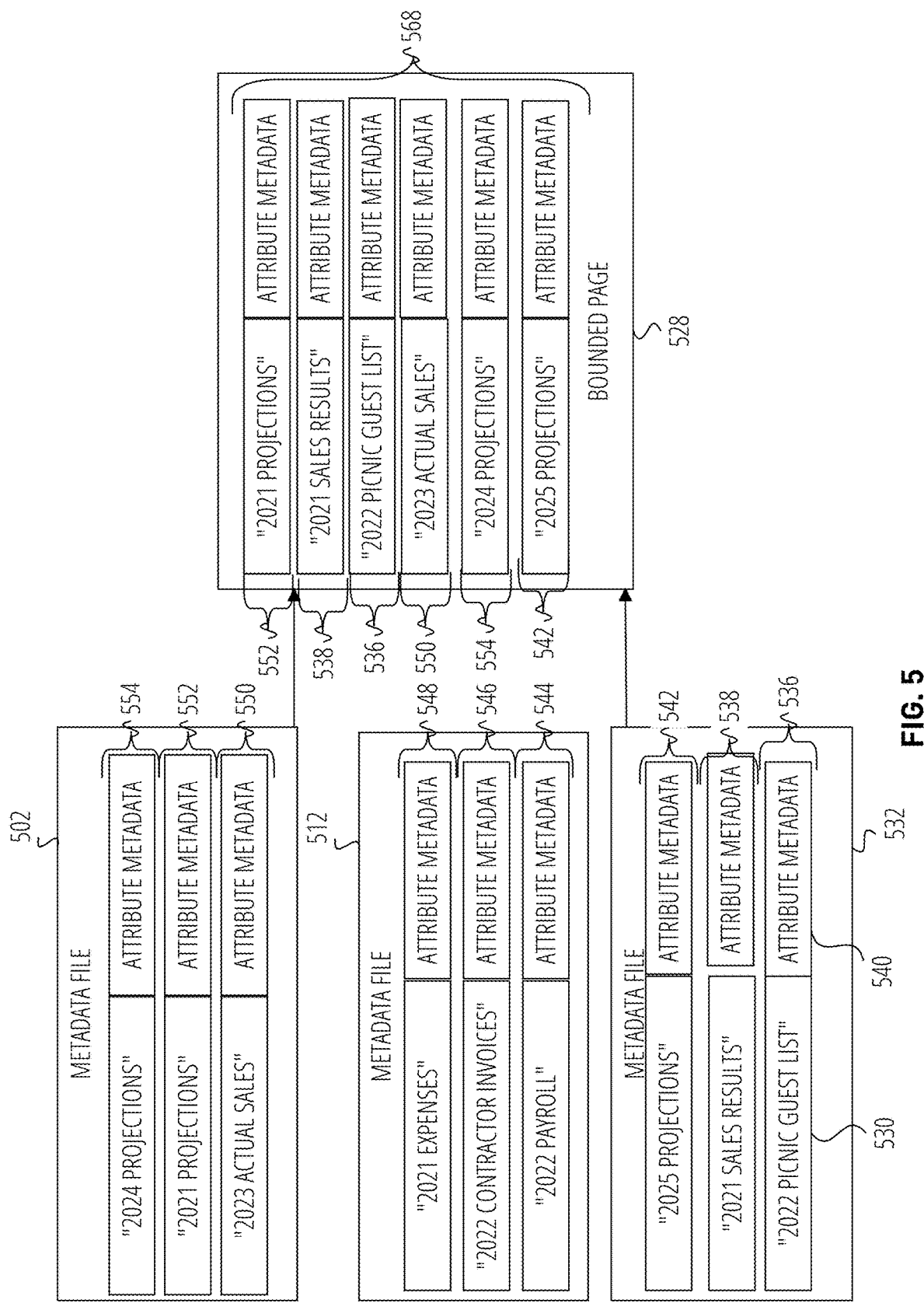
FIG. 5 illustrates metadata structures used by a file existence checking method, according to some examples.
Figure 6:
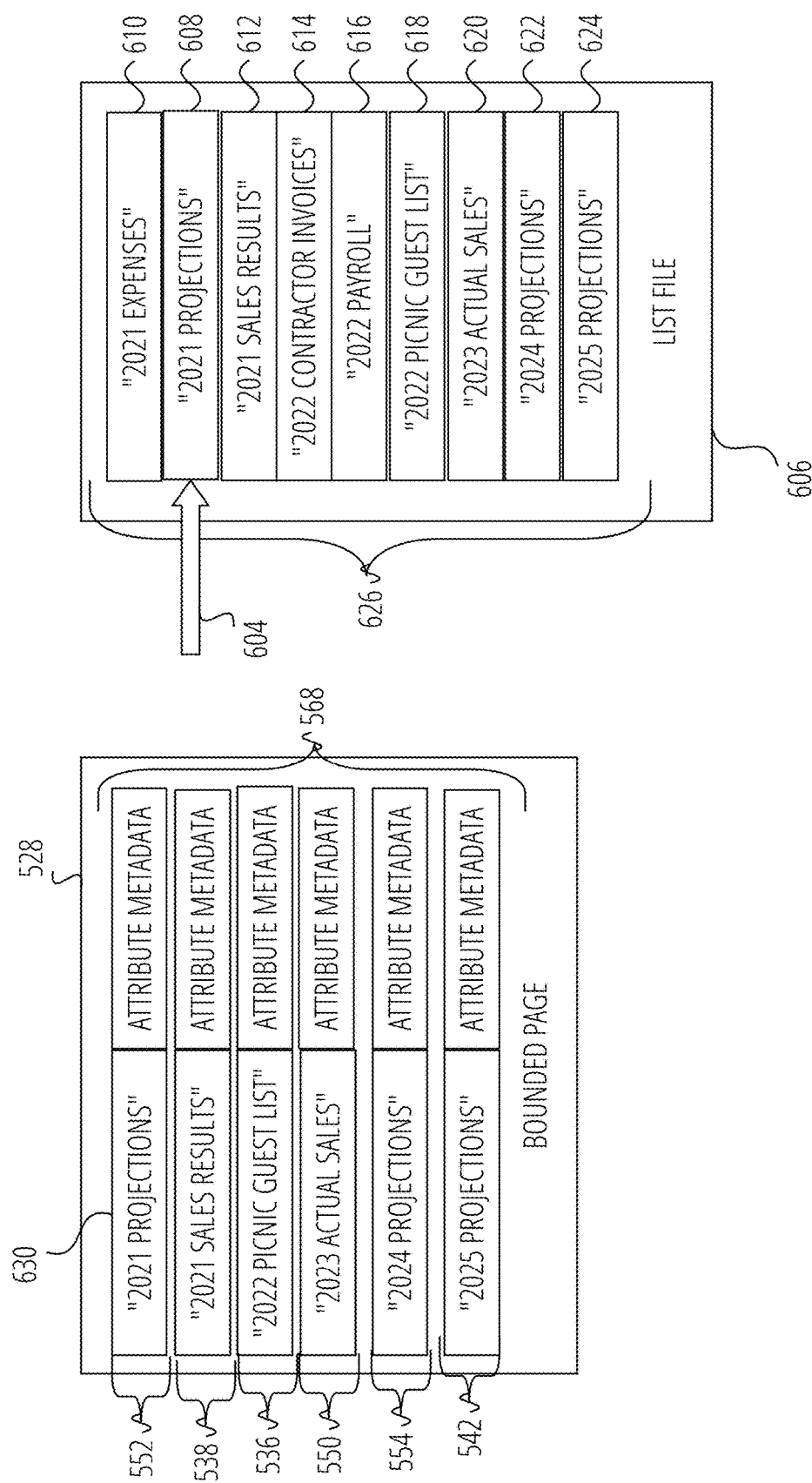
FIG. 6 illustrates sorted list data structures used by a file existence checking method, according to some examples.

In operation 406, the compute service manager stores, in a first sorted list in the bounded page, the set of data file metadata of each selected metadata file. This sorting process allows for efficient searching and comparison operations. In some examples, the first sorted list is sorted based on a lexical order of the file names for the respective data files of each member of the set of data file metadata files. This lexical ordering facilitates faster lookups and comparisons when checking file existence. As illustrated in FIG. 5, bounded page 528 includes sorted list 568 including data file metadata file 552, data file metadata file 538, data file metadata file 536, data file metadata file 550, data file metadata file 554, and data file metadata file 542 that are sorted in a lexical order based on the file name included in each data file metadata file.

In some examples, the compute service manager may filter data file metadata files having duplicate file names from the first sorted list before storing it in the bounded page. This filtering process helps to optimize memory usage and improve the efficiency of subsequent operations.

In operation 408, the compute service manager retrieves, from the data storage system a second sorted list of file names of a set of data files stored on the data storage system. This second sorted list represents the actual files stored in the data storage system, allowing for comparison with the metadata stored in the data platform. In some examples, a data storage system, such as data storage system 106 shown in FIG. 1 can include multiple data storage devices, such as data storage devices 108-1 to 108-N, which can be cloud-based storage devices located in one or more geographic locations.

In some examples, the second sorted list is retrieved using a LIST API call to the data storage system. A LIST API call is a type of API request used to retrieve a collection or list of resources from a server, such as a set of data file metadata for a file. These calls are made using HTTP GET requests and return a list of records that match specified criteria in the request parameters. LIST API calls are used for operations that involve fetching multiple items. This approach is more efficient than using individual calls for the data file metadata of each file, especially when dealing with billions of files.

In some examples, the first sorted list is sorted based on a lexical order of the file name for the respective data file of each member of the set of data file metadata file, and the second sorted list is sorted based on a lexical order of the file names of the set of data files, to facilitate efficient comparison operations. For example, in reference to FIG. 6, the compute service manager retrieves LIST file 606 that contains sorted list 626. The sorted list 626 includes a list of files names of the data platform that are stored in the data storage system and referenced by the metadata files of the data platform including file name 608, file name 610, file name 612, file name 614, file name 616, file name 618, file name 620, file name 622, and file name 624. These file names represent the actual files stored in the data storage system and are sorted in lexical order.

In operation 410, the compute service manager determines an existence of each respective data file of each member of the set of data file metadata file on the data storage system by comparing the first sorted list to the second sorted list. For example, the compute service manager compares the first sorted list (containing data file metadata files including file names) to the second sorted list (containing file names of all files stored on the data storage system) to determine the existence of each data file on the data storage system. This comparison process allows the compute service manager to check and verify that the data files expected based on the metadata stored in the data platform actually exist in the data storage system.

In some examples, the comparison is performed using a set of initial operations and subsequent operations. In reference to FIG. 6, the initial operations involve the compute service manager selecting an initial data file metadata file from the first sorted list, such as data file metadata file 552. Data file metadata file 552 includes a file name 630 referencing a data file in the data storage system. The compute service manager searches from the beginning of the second sorted list 626 for a matching file name, such as file name 608, and setting a sorted list file pointer 604 at the location where the match is found. The subsequent operations involve selecting a subsequent data file metadata file, such as data file metadata file 538, and searching from the location of the sorted list file pointer 604 for a matching file name, and updating the sorted list file pointer 604 accordingly.

In some examples, the compute service manager process all of the members of the set of metadata files by performing a selection without replacement, and the operations are repeated until all members of the set of metadata files are selected.

In some examples, compute service manager creates a plurality of bounded pages and creates a plurality of first sorted lists, each first sorted list stored in a respective bounded page of the plurality of bounded pages. The compute service manager determines an existence of each respective data file of each member of the set of data file metadata file on the data storage system further by comparing the plurality of first sorted lists to the second sorted list in parallel processes. This approach allows the compute service manager to optimize the file existence checking process by leveraging parallel processing. By creating multiple bounded pages and corresponding sorted lists, the compute service manager can distribute the workload across different processing units or threads, potentially improving the overall performance and efficiency of the file existence checking operation. The use of parallel processes for comparing the multiple first sorted lists to the second sorted list enables the compute service manager to handle large-scale data more effectively. This is particularly beneficial when dealing with billions of files in cloud-based data platforms, as it can significantly reduce the time required to complete the file existence checking process.

In some examples, by implementing this parallel comparison approach, the compute service manager can scale the file existence checking process horizontally, potentially utilizing multiple compute nodes or processing units within the execution platform. This can lead to improved performance and reduced execution times, especially when dealing with large datasets and complex file systems In some examples, the compute service manager performs a consistency check for each data file using attribute data associated with each file name in the second sorted list and the data file metadata file.

In some examples, if a file name of a data file is not found in the second sorted list, the compute service manager uses individual calls to the data storage system to retrieve metadata of the data file to confirm the existence of the data file. For example, the file name of the data file that cannot be found in the second sorted list can be bundled into a batch of files and sent to a worker pool for further verification using individual HEAD calls to the data storage system for each data file. A HEAD call is an HTTP request method used to retrieve the headers of a resource without downloading the entire content. A HEAD call is similar to a GET request, but the server response does not include a message body, only headers associated with the resource. This method is useful for obtaining metadata about a resource, such as its size, type, and last modification date, without transferring the actual data.

In some examples, the compute service manager compares the first sorted list to the second sorted list by performing a set of initial operations and one or more subsequent operations. For the initial operations, the compute service manager selects an initial data file metadata file from the first sorted list, searches from the beginning of the second sorted list for a file name included in the initial data file metadata file, and in response to finding the file name, sets a pointer at the location in the second sorted list where the file name was found. For the subsequent operations, the compute service manager selects a subsequent data file metadata file from the first sorted list, searches from the location of the pointer for a file name included in the subsequent data file metadata file, and in response to finding the file name, sets the pointer in the second sorted list at the location where the file name was found. This approach allows the compute service manager to efficiently compare the two sorted lists by leveraging their lexical ordering. By setting and updating a pointer in the second sorted list, the compute service manager can avoid redundant searches and optimize the comparison process, especially when dealing with large datasets.

In some examples, the compute service manager pre-filters the set of metadata files on a basis of a size of metadata file of the set of metadata files satisfying a threshold condition such as by meeting or falling below a threshold size or the like. In some examples, in response to determining the size of the metadata file meets or falls below the threshold size, the compute service manager determines the existence of each respective data file of each member of the set of data file metadata file on the data storage system based on a metadata request for the respective data file to the data storage system. By using a metadata request for smaller files, the compute service manager can potentially reduce the overhead associated with creating and managing bounded pages for very small datasets. This method may be more efficient for metadata files that fall below a certain size threshold, as it allows for direct verification of file existence without the need for the more complex sorting and comparison processes used for larger datasets. Through this process, the compute service manager adapts its file existence checking strategy based on the characteristics of the metadata files being processed. By employing different methods for files of different sizes, the compute service manager can optimize resource usage and potentially improve overall performance, especially in scenarios where there is a mix of large and small metadata files to be processed.

In some examples, the second sorted list includes attribute data associated with each file name of the second sorted list, and the compute service manager performs a consistency check for each data file using the attribute data and data file metadata file. This consistency check allows the compute service manager to not only verify the existence of files but also to ensure that the attributes of the files in the data storage system match the metadata stored in the data platform. By using the attribute data in the second sorted list, the compute service manager can perform a more comprehensive verification process. This attribute data may include information such as file size, creation date, modification date, or other relevant metadata. The consistency check compares this attribute data from the data storage system with the corresponding information in the data file metadata files, providing an additional layer of integrity verification beyond simple file existence.

This approach enables the compute service manager to detect discrepancies between the expected file attributes (as stored in the metadata) and the actual file attributes in the data storage system. Such discrepancies could indicate potential issues such as file corruption, unauthorized modifications, or synchronization problems between the metadata and the actual data files.

Figure 7:
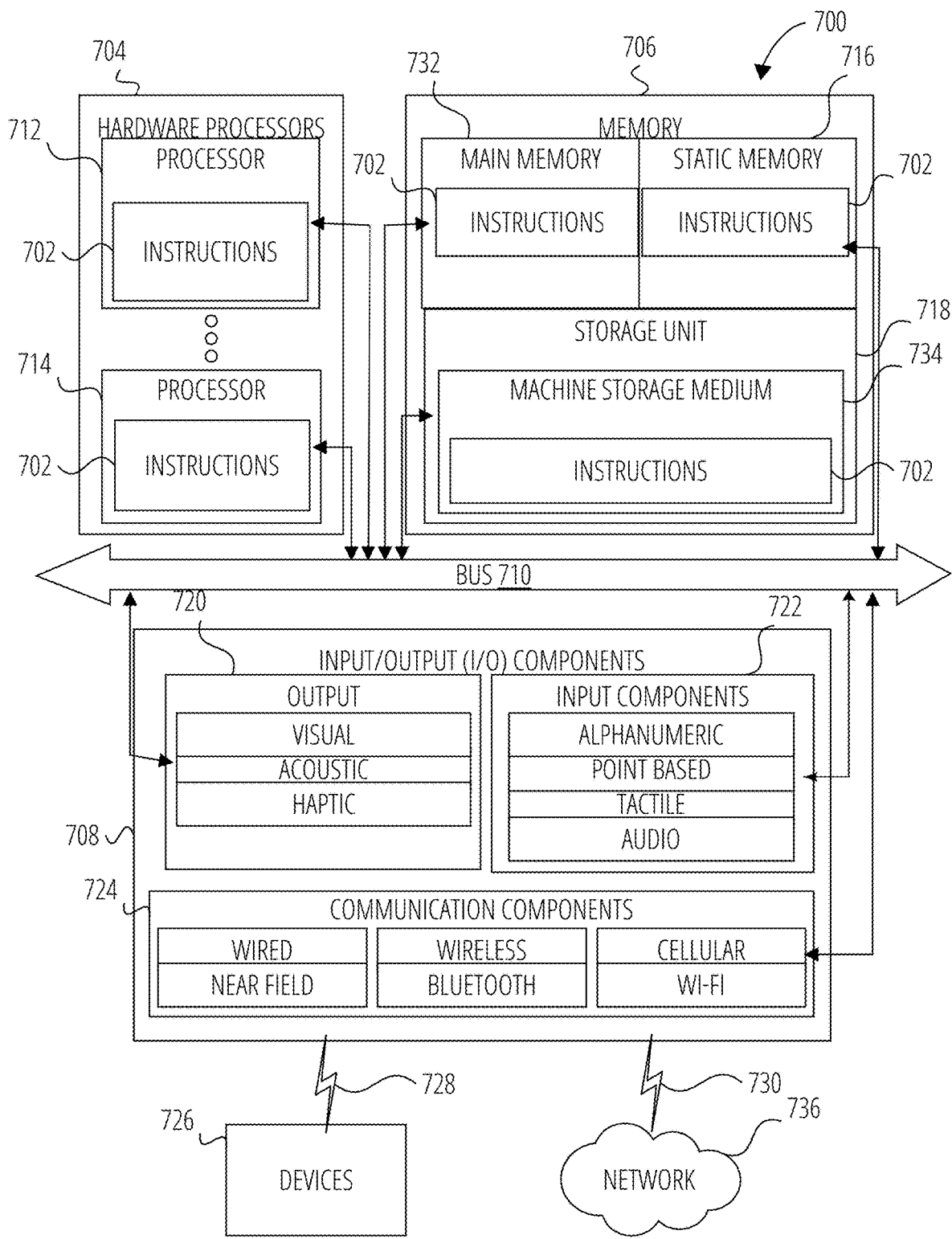
FIG. 7 illustrates a diagrammatic representation of a machine in the form of a computer system within which a set of instructions may be executed for causing the machine to perform any one or more of the methodologies discussed herein, according to some examples.

FIG. 7 illustrates a diagrammatic representation of a machine 700 in the form of a computer system within which a set of instructions may be executed for causing the machine 700 to perform any one or more of the methodologies discussed herein, according to examples. Specifically, FIG. 7 shows a diagrammatic representation of the machine 700 in the example form of a computer system, within which instructions 702 (e.g., software, a program, an application, an applet, an application, or other executable code) for causing the machine 700 to perform any one or more of the methodologies discussed herein may be executed. For example, the instructions 702 may cause the machine 700 to execute any one or more operations of any one or more of the methods described herein. In this way, the instructions 702 transform a general, non-programmed machine into a particular machine 700 (e.g., the compute service manager 104, the execution platform 110, and the data storage devices 108-1 to 108-N of data storage system 106) that is specially configured to carry out any one of the described and illustrated functions in the manner described herein.

In alternative examples, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 702, sequentially or otherwise, that specify actions to be taken by the machine 700. Further, while only a single machine 700 is illustrated, the term "machine" shall also be taken to include a collection of machines that individually or jointly execute the instructions 702 to perform any one or more of the methodologies discussed herein.

The machine 700 includes hardware processors 704, memory 706, and I/O components 708 configured to communicate with each other such as via a bus 710. In some examples, the hardware processors 704 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another hardware processor, or any suitable combination thereof) may include, for example, multiple processors as exemplified by processor 712 and a processor 714 that may execute the instructions 702. The term "processor" is intended to include multi-core processors that may comprise two or more independent processors (sometimes referred to as "cores") that may execute instructions 702 contemporaneously. Although FIG. 7 shows multiple hardware processors 704, the machine 700 may include a single processor with a single core, a single processor with multiple cores (e.g., a multi-core processor), multiple processors with a single core, multiple processors with multiple cores, or any combination thereof.

The memory 706 may include a main memory 732, a static memory 716, and a storage unit 718 including a machine storage medium 734, accessible to the hardware processors 704 such as via the bus 710. The main memory 732, the static memory 716, and the storage unit 718 store the instructions 702 embodying any one or more of the methodologies or functions described herein. The instructions 702 may also reside, completely or partially, within the main memory 732, within the static memory 716, within the storage unit 718, within at least one of the hardware processors 704 (e.g., within the processor's cache memory), or any suitable combination thereof, during execution thereof by the machine 700.

The input/output (I/O) components 708 include components to receive input, provide output, produce output, transmit information, exchange information, capture measurements, and so on. The specific I/O components 708 that are included in a particular machine 700 will depend on the type of machine. For example, portable machines such as mobile phones will likely include a touch input device or other such input mechanisms, while a headless server machine will likely not include such a touch input device. It will be appreciated that the I/O components 708 may include many other components that are not shown in FIG. 7. The I/O components 708 are grouped according to functionality merely for simplifying the following discussion and the grouping is in no way limiting. In various examples, the I/O components 708 may include output components 720 and input components 722. The output components 720 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 722 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 708 may include communication components 724 operable to couple the machine 700 to a network 736 or devices 726 via a coupling 730 and a coupling 728, respectively. For example, the communication components 724 may include a network interface component or another suitable device to interface with the network 736. In further examples, the communication components 724 may include wired communication components, wireless communication components, cellular communication components, and other communication components to provide communication via other modalities. The devices 726 may be another machine or any of a wide variety of peripheral devices (e.g., a peripheral device coupled via a universal serial bus (USB)). For example, as noted above, the machine 700 may correspond to any one of the compute service manager 104, the execution platform 110, and the devices 726 may include the data storage device 226 or any other computing device described herein as being in communication with the data platform 102 or the data storage system 106.

The various memories (e.g., 706, 716, 732, and/or memory of the processor(s) 704 and/or the storage unit 718) may store one or more sets of instructions 702 and data structures (e.g., software) embodying or utilized by any one or more of the methodologies or functions described herein. These instructions 702, when executed by the processor(s) 704, cause various operations to implement the disclosed examples.

Described implementations of the subject matter can include one or more features, alone or in combination as illustrated below by way of example:

Example 1 is a machine-implemented method comprising: creating a bounded page in a memory of a machine; selecting, from a set of metadata files, a set of selected metadata files, each selected metadata file including a set of data file metadata files, each member of the set of data file metadata files including a file name of a respective data file; storing, in a first sorted list in the bounded page, the set of data file metadata files of each selected metadata file; retrieving, from a data storage system, a second sorted list of file names of a set of data files stored on the data storage system; and determining an existence of each respective data file of each member of the set of data file metadata files on the data storage system by comparing the first sorted list to the second sorted list.

In Example 2, the subject matter of Example 1 wherein the selecting operation comprises a selection without replacement, and wherein the operations are repeated until all members of the set of metadata files are selected.

In Example 3, the subject matter of any one or more of Examples 1-2 wherein the set of selected metadata files are selected using a knapsack fitting algorithm using a size of each member of the set of metadata files and a size of the bounded page.

In Example 4, the subject matter of any one or more of Examples 1-3 further comprising filtering duplicate file names from the first sorted list.

In Example 5, the subject matter of any one or more of Examples 1-4 wherein the first sorted list is sorted based on a lexical order of the file name for the respective data file of each member of the set of data file metadata files, and wherein the second sorted list is sorted based on a lexical order of the file names of the set of data files.

In Example 6, the subject matter of any one or more of Examples 1-5 wherein comparing the first sorted list to the second sorted list comprises: performing a set of initial operations, comprising: selecting an initial data file metadata file from the first sorted list; searching from a beginning of the second sorted list for a file name included in the initial data file metadata file; and in response to finding the file name included in the initial data file metadata file, setting a pointer at a location in the second sorted list where the file name included in the initial data file metadata file was found; and performing one or more subsequent operations comprising: selecting a subsequent data file metadata file from the first sorted list; searching from the location of the pointer for a file name included in the subsequent data file metadata file; and in response to finding the file name included in the subsequent data file metadata file, setting the pointer in the second sorted list at a location where the file name included in the subsequent data file metadata file was found.

In Example 7, the subject matter of any one or more of Examples 1-6 wherein the operations further comprise: creating a plurality of bounded pages; and creating a plurality of first sorted lists, each first sorted list stored in a respective bounded page of the plurality of bounded pages, and wherein determining an existence of each respective data file of each member of the set of data file metadata files on the data storage system further comprises comparing the plurality of first sorted lists to the second sorted list in parallel processes.

In Example 8, the subject matter of any one or more of Examples 1-7 further comprising: pre-filtering the set of metadata files on a basis of a size of a member metadata file of the set of metadata files satisfying a threshold condition.

In Example 9, the subject matter of any one or more of Examples 1-8 further comprising: in response to determining the size of the member metadata file meets or falls below the threshold size, determining the existence of each respective data file of each member of the set of data file metadata files on the data storage system based on a metadata request for the respective data file to the data storage system.

In Example 10, the subject matter of any one or more of Examples 1-9 wherein the second sorted list includes attribute data associated with each file name of the second sorted list, and wherein the operations further comprise performing a consistency check for each data file using the attribute data and a respective data file metadata file.

Example 11 is at least one machine-readable medium including instructions that, when executed by processing circuitry, cause the processing circuitry to perform operations to implement any one or more of Examples 1-10.

Example 12 is an apparatus comprising means to implement any one or more of Examples 1-10.

Example 13 is a system to implement any one or more of Examples 1-10.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various examples, one or more portions of the network 736 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 736 or a portion of the network 736 may include a wireless or cellular network, and the coupling 730 may be a Code Division Multiple Access (CDMA) connection, a Global System for Mobile communications (GSM) connection, or another type of cellular or wireless coupling. In this example, the coupling 730 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 702 may be transmitted or received over the network 736 using a transmission medium via a network interface device (e.g., a network interface component included in the communication components 724) and utilizing any one of a number of well-known transfer protocols (e.g., hypertext transfer protocol (HTTP)). Similarly, the instructions 702 may be transmitted or received using a transmission medium via the coupling 728 (e.g., a peer-to-peer coupling) to the devices 726. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 702 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methodologies disclosed herein may be performed by one or more processors. The performance of certain of the operations may be distributed among the one or more processors, not only residing within a single machine, but also deployed across a number of machines. In some examples, the processor or processors may be located in a single location (e.g., within a home environment, an office environment, or a server farm), while in other examples the processors may be distributed across a number of locations.

Described implementations of the subject matter can include one or more features, alone or in combination as illustrated below by way of example.

< >

Although the examples of the present disclosure have been described with reference to specific examples, it will be evident that various modifications and changes may be made to these examples without departing from the broader scope of the inventive subject matter. Accordingly, the specification and drawings are to be regarded in an illustrative rather than a restrictive sense. The accompanying drawings that form a part hereof show, by way of illustration, and not of limitation, specific examples in which the subject matter may be practiced. The examples illustrated are described in sufficient detail to enable those skilled in the art to practice the teachings disclosed herein. Other examples may be used and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Such examples of the inventive subject matter may be referred to herein, individually and/or collectively, by the term "example" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art, upon reviewing the above description.

What is claimed is:

1. A machine-implemented method comprising:
creating a bounded page in a memory of a machine; and
performing operations comprising:
    selecting, from a set of metadata files, a set of selected metadata files, each selected metadata file including a set of data file metadata files, each member of the set of data file metadata files including a file name of a respective data file;
    storing, in a first sorted list in the bounded page, the set of data file metadata files of each selected metadata file;
    retrieving, from a data storage system, a second sorted list of file names of a set of data files stored on the data storage system;
    determining an existence of each respective data file of each member of the set of data file metadata files on the data storage system by comparing the first sorted list to the second sorted list;
    creating a plurality of bounded pages; and
    creating a plurality of first sorted lists, each first sorted list stored in a respective bounded page of the plurality of bounded pages, the determining an existence of each respective data file of each member of the set of data file metadata files on the data storage system further comprising comparing the plurality of first sorted lists to the second sorted list in parallel processes.

2. The machine-implemented method of claim 1,
wherein the selecting operation comprises a selection without replacement, and
wherein the operations are repeated until all members of the set of metadata files are selected.

3. The machine-implemented method of claim 1, wherein the set of selected metadata files are selected using a knapsack fitting algorithm using a size of each member of the set of metadata files and a size of the bounded page.

4. The machine-implemented method of claim 1, further comprising filtering duplicate file names from the first sorted list.

5. The machine-implemented method of claim 1,
wherein the first sorted list is sorted based on a lexical order of the file name for the respective data file of each member of the set of data file metadata files, and
wherein the second sorted file is sorted based on a lexical order of the file names of the set of data files.

6. The machine-implemented method of claim 5, wherein comparing the first sorted list to the second sorted list comprises:
    performing a set of initial operations, comprising:

selecting an initial data file metadata file from the first sorted list;
searching from a beginning of the second sorted list for a file name included in the initial data file metadata file; and
in response to finding the file name included in the initial data file metadata file, setting a pointer at a location in the second sorted list where the file name included in the initial data file metadata file was found; and
performing one or more subsequent operations comprising:
selecting a subsequent data file metadata file from the first sorted list;
searching from the location of the pointer for a file name included in the subsequent data file metadata file; and
in response to finding the file name included in the subsequent data file metadata file, setting the pointer in the second sorted list at a location where the file name included in the subsequent data file metadata file was found.

7. The machine-implemented method of claim 1, further comprising:
pre-filtering the set of metadata files on a basis of a size of a member metadata file of the set of metadata files satisfying a threshold condition.

8. The machine-implemented method of claim 7, further comprising:
in response to determining the size of the member metadata file meets or falls below the threshold size, determining the existence of each respective data file of each member of the set of data file metadata files on the data storage system based on a metadata request for the respective data file to the data storage system.

9. The machine-implemented method of claim 1,
wherein the second sorted list includes attribute data associated with each file name of the second sorted list, and
wherein the operations further comprise performing a consistency check for each data file using the attribute data and a respective data file metadata file.

10. A system comprising:
at least one processor; and
at least one memory storing instructions that, when executed by the at least one processor, cause the system to perform operations comprising:
creating a bounded page in a memory of a machine;
selecting, from a set of metadata files, a set of selected metadata files, each selected metadata file including a set of data file metadata files, each member of the set of data file metadata files including a file name of a respective data file;
storing, in a first sorted list in the bounded page, the set of data file metadata files of each selected metadata file;
retrieving, from a data storage system, a second sorted list of file names of a set of data files stored on the data storage system;
determining an existence of each respective data file of each member of the set of data file metadata files on the data storage system by comparing the first sorted list to the second sorted list;
creating a plurality of bounded pages; and
creating a plurality of first sorted lists, each first sorted list stored in a respective bounded page of the plurality of bounded pages, the determining an existence of each respective data file of each member of the set of data file metadata files on the data storage system further comprising comparing the plurality of first sorted lists to the second sorted list in parallel processes.

11. The system of claim 10,
wherein the selecting operation comprises a selection without replacement, and
wherein the second operations are repeated until all members of the set of metadata files are selected.

12. The system of claim 10, wherein the set of selected metadata files are selected using a knapsack fitting algorithm using a size of each member of the set of metadata files and a size of the bounded page.

13. The system of claim 10, wherein the operations further comprise filtering duplicate file names from the first sorted list.

14. The system of claim 10,
wherein the first sorted list is sorted based on a lexical order of the file name for the respective data file of each member of the set of data file metadata files, and
wherein the second sorted file is sorted based on a lexical order of the file names of the set of data files.

15. The system of claim 14, wherein comparing the first sorted list to the second sorted list comprises:
performing a set of initial operations, comprising:
selecting an initial data file metadata file from the first sorted list;
searching from a beginning of the second sorted list for a file name included in the initial data file metadata file; and
in response to finding the file name included in the initial data file metadata file, setting a pointer at a location in the second sorted list where the file name included in the initial data file metadata file was found; and
performing one or more subsequent operations comprising:
selecting a subsequent data file metadata file from the first sorted list;
searching from the location of the pointer for a file name included in the subsequent data file metadata file; and
in response to finding the file name included in the subsequent data file metadata file, setting the pointer in the second sorted list at a location where the file name included in the subsequent data file metadata file was found.

16. The system of claim 10, wherein the operations further comprise:
pre-filtering the set of metadata files on a basis of a size of a member metadata file of the set of metadata files satisfying a threshold condition.

17. The system of claim 16, wherein the operations further comprise:
in response to determining the size of the member metadata file meets or falls below the threshold size, determining the existence of each respective data file of each member of the set of data file metadata files on the data storage system based on a metadata request for the respective data file to the data storage system.

18. The system of claim 10,
wherein the second sorted list includes attribute data associated with each file name of the second sorted list, and
wherein the operations further comprise performing a consistency check for each data file using the attribute data and a respective data file metadata file.

19. A machine-storage medium storing instructions that, when executed by one or more processors of a system, cause the system to perform operations comprising:

creating a bounded page in a memory of a machine;
selecting, from a set of metadata files, a set of selected metadata files, each selected metadata file including a set of data file metadata files, each member of the set of data file metadata files including a file name of a respective data file;
storing, in a first sorted list in the bounded page, the set of data file metadata files of each selected metadata file;
retrieving, from a data storage system, a second sorted list of file names of a set of data files stored on the data storage system;
determining an existence of each respective data file of each member of the set of data file metadata files on the data storage system by comparing the first sorted list to the second sorted list;
creating a plurality of bounded pages; and
creating a plurality of first sorted lists, each first sorted list stored in a respective bounded page of the plurality of bounded pages, the determining an existence of each respective data file of each member of the set of data file metadata files on the data storage system further comprising comparing the plurality of first sorted lists to the second sorted list in parallel processes.

20. The machine-storage medium of claim 19,
wherein the selecting operation comprises a selection without replacement, and
wherein the second operations are repeated until all members of the set of metadata files are selected.

21. The machine-storage medium of claim 19, wherein the set of selected metadata files are selected using a knapsack fitting algorithm using a size of each member of the set of metadata files and a size of the bounded page.

22. The machine-storage medium of claim 19, wherein the operations further comprise filtering duplicate file names from the first sorted list.

23. The machine-storage medium of claim 19,
wherein the first sorted list is sorted based on a lexical order of the file name for the respective data file of each member of the set of data file metadata files, and
wherein the second sorted file is sorted based on a lexical order of the file names of the set of data files.

24. The machine-storage medium of claim 23, wherein comparing the first sorted list to the second sorted list comprises:
performing a set of initial operations, comprising:
selecting an initial data file metadata file from the first sorted list;
searching from a beginning of the second sorted list for a file name included in the initial data file metadata file; and
in response to finding the file name included in the initial data file metadata file, setting a pointer at a location in the second sorted list where the file name included in the initial data file metadata file was found; and
performing one or more subsequent operations comprising:
selecting a subsequent data file metadata file from the first sorted list;
searching from the location of the pointer for a file name included in the subsequent data file metadata file; and
in response to finding the file name included in the subsequent data file metadata file, setting the pointer in the second sorted list at a location where the file name included in the subsequent data file metadata file was found.

25. The machine-storage medium of claim 19, wherein the operations further comprise:
pre-filtering the set of metadata files on a basis of a size of a member metadata file of the set of metadata files satisfying a threshold condition.

26. The machine-storage medium of claim 25, wherein the operations further comprise:
in response to determining the size of the member metadata file meets or falls below the threshold size, determining the existence of each respective data file of each member of the set of data file metadata files on the data storage system based on a metadata request for the respective data file to the data storage system.

27. The machine-storage medium of claim 19,
wherein the second sorted list includes attribute data associated with each file name of the second sorted list, and
wherein the operations further comprise performing a consistency check for each data file using the attribute data and a respective data file metadata file.

* * * * *